(No Model.)  J. M. BOLTON.  2 Sheets—Sheet 1.
CORN PLANTER.
No. 326,388.  Patented Sept. 15, 1885.
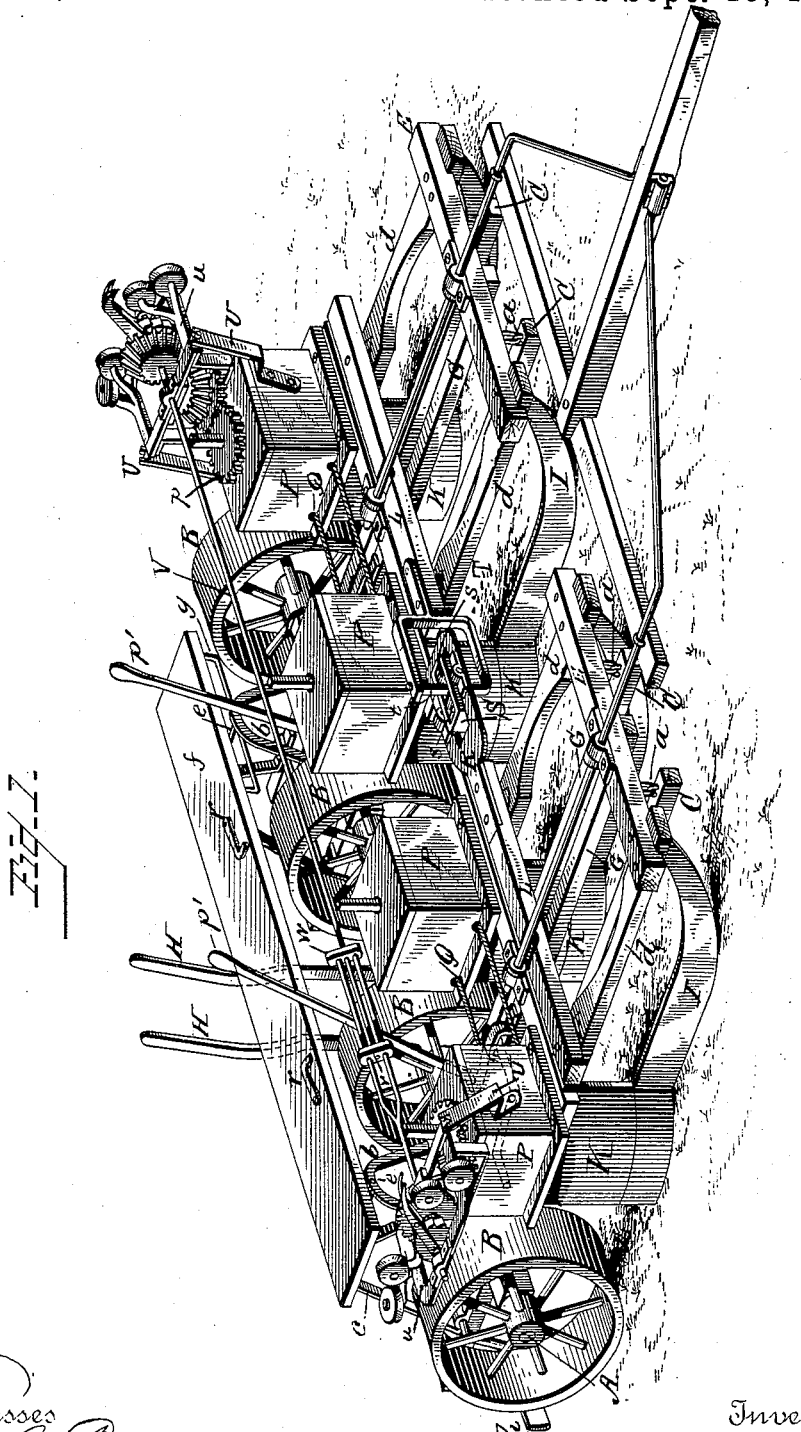

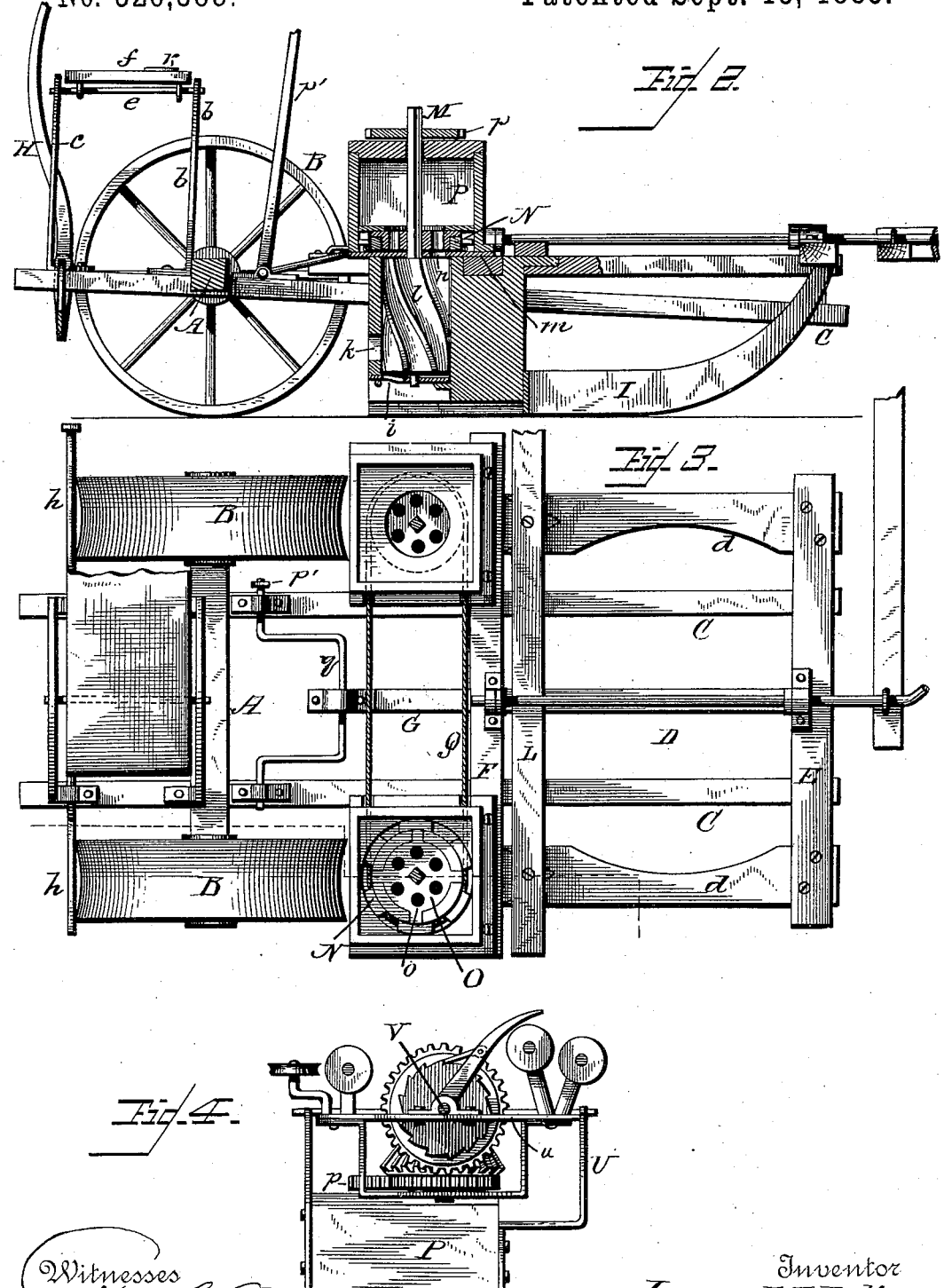

UNITED STATES PATENT OFFICE.

JAMES M. BOLTON, OF MAPLETON, IOWA.

CORN-PLANTER.

SPECIFICATION forming part of Letters Patent No. 326,388, dated September 15, 1885.

Application filed May 28, 1885. (No model.)

*To all whom it may concern:*

Be it known that I, JAMES M. BOLTON, a citizen of the United States, residing at Mapleton, in the county of Monona and State of Iowa, have invented certain new and useful Improvements in Corn-Planters; and I do hereby declare that the following is a full, clear, and exact description of the same, reference being had to the annexed drawings, making a part of this specification, and to the letters and figures of reference marked thereon.

This invention relates to certain new and useful improvements in check-row planters, and has for its objects to simplify and cheapen the construction and render more efficient in operation this class of agricultural implements; and to these ends and such others as the invention may pertain it consists in the peculiar combinations and the novel construction and arrangement of parts hereinafter more fully described, and specifically defined by the appended claims.

In the accompanying drawings, which form a part of this specification, Figure 1 is a perspective view of a complete machine constructed according to my invention. Fig. 2 is a section through one of the feed-hoppers. Fig. 3 is a plan of one of the frames with parts removed, the better to show the construction of other parts. Fig. 4 is a detail.

Referring to the drawings by letter, A indicates the axle and B the supporting-wheels or coverers supported thereby. There are two of the axles and two sets of wheels, and as the frames and devices carried thereby are exact duplicates of each other it will be necessary to describe only one.

C are bars rigidly secured near their rear ends to the axle A. D is a frame composed of the longitudinal bars $d$ joined together at their outer ends by the transverse bar E, and at their inner ends by the bar F, to which the forward end of the hoppers are secured. G is a bar secured to the end bars, E F, midway between the bars $d\ d$. The bars C are pivotally connected at their front ends with the transverse bar E by links $a$. (See Fig. 1.) Arising from these bars C just in rear of the axle are uprights $b\ b$, preferably U-shaped, and near the extreme rear ends of these bars C are secured similar uprights, $c$. A bar, $e$, connects these uprights, and by these bars the seat $f$ is supported. This seat is rigidly secured at the outer end of one frame to the bar $e$, while at the outer end of the other frame it is provided on its under side with guide-loops $g$, which embrace the bar $e$ at this end and thus allow the seat to have a little lateral play for the purpose hereinafter explained.

H is a lever for operating a scraper, $h$, which may be of any approved form and is designed to scrape the coverers B and remove mud or damp earth that adheres to them.

I are runners attached at their forward ends to the bar E, and their rear ends embrace and are rigidly secured to the lower end of a feed-spout, K, which in turn is attached to and supported by the bar $d$ and the bar L, soon to be described. This feed-spout has a discharge-opening, $i$, through which the seed passes, and at its rear side is provided with an opening, $k$, which is covered with glass in order that the driver may watch the feed, if desired. Within a hole in the bottom of this feed-spout is stepped a shaft, M, carrying a fluted cylinder or worm-feed, $l$. A thin plate, $m$, having a feed-hole, $n$, is secured to the top of this feed-spout. Resting on top of this plate is a sprocket-wheel, N, recessed on its top face to receive the arms of the feed-plate O, provided with holes $o$, as shown.

P is a feed-box or hopper, secured in any suitable manner to the top of the feed-spout above the plate $m$. It is provided with a cover having a depending flange, as shown, to prevent its accidental displacement. Through this cover projects the end of the shaft M, and on the projecting end of this shaft is secured a sprocket-wheel, $p$.

Q is an endless cord or chain connecting the sprocket-wheels N, for the purpose soon to be explained.

$p'$ is a lever connected to or formed integral with a crank shaft, $q$, journaled in the bars C, and having its center portion loosely connected with the rear end of the center bar, G, of the frame. By means of this lever the whole frame with its attachments can be raised so as to bring the runners and feed-spout clear of the ground.

r are catches for holding the lever when it is thrown back.

The two frames are flexibly connected at their adjoining ends in any convenient manner, but preferably by the means shown in Fig. 1, where R represents a plate secured to the bar L of one frame. In a recess in the outer end of this plate is pivoted a frame, S, in which are journaled two anti-friction rollers, s s. On the end of the bar L of the other frame is a plate, T, terminating in a light rectangular frame, the upright t of which passes loosely between the rollers s. By this means the two frames are connected together, and yet move independent of the other, thus providing for the passage of the machine over hilly ground without wrenching or straining of the parts.

Upon the outer end of each hopper are secured brackets U. Swivelly supported by these brackets are frames u, carrying guide-rollers for the check-cord, and the usual bifurcated arms over which the check-cord passes. This frame also carries a bevel-gear meshing with a similar bevel-gear on the shaft V, and also a gear-wheel meshing with the gear-wheel p. The shaft V, connecting the two frames u, is made telescopic, as shown, to provide for its lengthening and shortening according to the variation in the ground. This shaft is preferably, although not necessarily, constructed as shown in the drawings, where v represents a cross-piece to which the end of one section of the shaft is rigidly secured. The end of the other shaft is bifurcated, as shown, and each end of the fork is rigidly secured to the cross-piece w, through an opening in the center of which the other section of the shaft passes loosely. The forked ends of the other section pass loosely through openings in the cross-piece v, as shown.

A single tongue serves for both planters, and is connected thereto in any suitable manner, so as to yield to the variations in the ground.

From the foregoing description the operation of the device will be readily understood. Draft being applied the check-cord passes loosely over the bifurcated arm till a knot comes in contact therewith, when said arm is drawn rearward, which movement turns the shaft V, owing to the engagement of a pawl carried by said arm with a ratchet-wheel on said shaft. This motion, by reason of the bevel-gears above described, imparts motion to the gear-wheel p, and from thence to the shaft M, which in turn revolves the feed-plate O, and the seed passes through one of the openings o, through the opening n into one of the channels of the fluted cylinder l. In the next revolution of the shaft the seed is deposited in the space opened by the runner and another lot of seed is deposited in the next succeeding channel of the cylinder, and so on. The seed thus deposited is covered by the wheels B.

While I have shown and described the wheels P and W as gear-wheels, I do not intend to limit myself, as it is evident that sprocket-wheels connected by a chain would serve equally as well.

Having thus described my invention, what I claim as new is—

1. In a check-row planter, two separate independent frames, each carrying feed-hoppers and feed-regulating devices yieldingly connected together, a laterally-moving seat connected to said frames, in combination with a fluted cylinder stepped in the spout of the feed-hopper, a perforated feed-plate carried by the shaft of the cylinder, and means for rotating the shaft, substantially as and for the purpose set forth.

2. The combination, with the hoppers and the brackets attached thereto, of the frames u, swivelly supported in said brackets, and a telescopic shaft connecting said frames, as and for the purpose specified.

3. The combination, with the two frames yieldingly connected together, of the hoppers supported thereby, the brackets attached to said hoppers, and the frames u, swivelly supported by said brackets and connected together by a telescopic shaft, as and for the purpose described.

4. The combination, with the feed-hoppers and spouts and fluted cylinders, of a sprocket-wheel secured to the shaft of each cylinder, an endless cord passing around said wheels, a gear-wheel on the projecting end of said shafts, and means, substantially as described, for rotating said shaft, substantially as and for the purpose described.

5. The combination, with the two frames D D, yieldingly connected together, as shown, of a single tongue yieldingly connected with said frames and adapted to serve conjointly therewith, whereby said frames will pass over uneven ground without disturbing the feed mechanism, as set forth.

6. In a check-row planter, the combination, with the two separate independent frames D D and the bars L, attached one to each of said frames and overlapping the same at their adjacent sides, of the plate R, secured to one of said bars and provided with rollers s s, and the plate T, attached to the other bar and terminating in a rectangular frame, the upright t of which passes loosely between said rollers, substantially as and for the purpose specified.

In testimony that I claim the above I have hereunto subscribed my name in the presence of two witnesses.

JAMES M. BOLTON.

Witnesses:
J. W. LING,
E. S. CROW.